United States Patent
Park et al.

(10) Patent No.: US 11,964,577 B2
(45) Date of Patent: Apr. 23, 2024

(54) LOW VOLTAGE DC-DC CONVERTER OF ENVIRONMENTALLY FRIENDLY VEHICLE, AND METHOD FOR OUTPUTTING CONSTANT VOLTAGE USING THE SAME

(71) Applicants: Hyundai Motor Company, Seoul (KR); Kia Corporation, Seoul (KR)

(72) Inventors: KwangKyu Park, Whasung-Si (KR); Ui Jung Jung, Whasung-Si (KR); Seungchan Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 224 days.

(21) Appl. No.: 17/748,652

(22) Filed: May 19, 2022

(65) Prior Publication Data
US 2023/0027762 A1    Jan. 26, 2023

(30) Foreign Application Priority Data
Jul. 23, 2021  (KR) .......................... 10-2021-0097055

(51) Int. Cl.
*B60L 53/20* (2019.01)
*B60L 3/00* (2019.01)
*H02M 1/00* (2006.01)
*H02M 3/158* (2006.01)

(52) U.S. Cl.
CPC ............. *B60L 53/20* (2019.02); *B60L 3/0046* (2013.01); *H02M 1/0045* (2021.05); *H02M 1/0067* (2021.05); *H02M 3/158* (2013.01); *B60L 2210/10* (2013.01); *B60L 2240/527* (2013.01); *B60L 2240/547* (2013.01); *H02M 1/007* (2021.05)

(58) Field of Classification Search
CPC ..... H02M 1/0067; H02M 1/007; B60L 53/20; B60L 3/0046; B60L 2210/10; B60L 2240/527; B60L 2240/547
See application file for complete search history.

(56) References Cited

U.S. PATENT DOCUMENTS

| | | | |
|---|---|---|---|
| 7,298,120 B2 * | 11/2007 | Lam .................... | H02M 7/5383 323/272 |
| 10,554,113 B1 * | 2/2020 | Kim .................. | H02M 3/33507 |
| 2013/0200846 A1 * | 8/2013 | Ang ........................ | B60L 1/003 320/109 |

* cited by examiner

*Primary Examiner* — Gary L Laxton
(74) *Attorney, Agent, or Firm* — MORGAN, LEWIS & BOCKIUS LLP

(57) ABSTRACT

A low voltage DC-DC converter of an environmentally friendly vehicle includes a first DC-DC converter configured to drop a second voltage lower than a first voltage supplied to a drive motor of the environmentally friendly vehicle to a third voltage, a voltage regulator configured to regulate the third voltage to output a fourth voltage lower than the third voltage, a controller configured to operate in response to the fourth voltage, and a second DC-DC converter configured to convert and output the first voltage into the third voltage in response to an output signal of the controller, in which an output voltage of the second DC-DC converter is supplied to the voltage regulator.

17 Claims, 2 Drawing Sheets

ND METHOD FOR OUTPUTTING
LOW VOLTAGE DC-DC CONVERTER OF ENVIRONMENTALLY FRIENDLY VEHICLE, AND METHOD FOR OUTPUTTING CONSTANT VOLTAGE USING THE SAME

CROSS-REFERENCE TO RELATED APPLICATION

The present application claims priority to Korean Patent Application No. 10-2021-0097055 filed on Jul. 23, 2021, the entire contents of which is incorporated herein for all purposes by this reference.

BACKGROUND OF THE PRESENT DISCLOSURE

Field of the Present Disclosure

The present disclosure relates to a vehicle, and more particularly, to a low voltage DC-DC converter of an environmentally friendly vehicle, and a method for outputting a constant voltage using the low voltage DC-DC converter.

Description of Related Art

In general, unlike existing internal combustion engine vehicles, an electric vehicle (EV) and a hybrid electric vehicle (HEV) included in environmentally friendly vehicles are driven by the force of a motor by battery power.

Since the environmentally friendly vehicles move even by the force of the motor, in the environmentally friendly vehicle, a high-voltage large capacity battery (or a main battery) and a low voltage DC-DC converter (LDC) charging an auxiliary battery such as an alternator by converting a voltage of a main battery to a low voltage are mounted. Here, the auxiliary battery generally means a vehicle battery of supplying the power to starting and various electric devices of the vehicle.

Furthermore, the LDC serves to supply the power by varying the voltage of the main battery according to the voltage used in an electronic load of the vehicle.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a low voltage DC-DC converter of an environmentally friendly vehicle, and a method for outputting a constant voltage using the low voltage DC-DC converter configured for performing the function of a battery as a constant power supply.

Various aspects of the present disclosure are directed to providing a low voltage DC-DC converter of an environmentally friendly vehicle including a first DC-DC converter configured to drop a second voltage lower than a first voltage supplied to a drive motor of the environmentally friendly vehicle to a third voltage; a voltage regulator configured to regulate the third voltage to output a fourth voltage lower than the third voltage; a controller configured to operate in response to the fourth voltage; and a second DC-DC converter configured to convert and output the first voltage into the third voltage in response to an output signal of the controller, in which the output voltage of the second DC-DC converter may be supplied to the voltage regulator.

The low voltage DC-DC converter of the environmentally friendly vehicle may further include a divider resistor configured to output the second voltage.

The controller may detect a failure of the divider resistor based on a voltage of the divider resistor.

The low voltage DC-DC converter of the environmentally friendly vehicle may further include a first switch configured to transmit the first voltage to the second DC-DC converter; and a second switch configured to transmit the first voltage to the divider resistor, supply the output voltage of the second DC-DC converter to the voltage regulator and then block the first voltage from being transmitted to the divider resistor.

The low voltage DC-DC converter of the environmentally friendly vehicle may further include block switches provided in an input terminal of the first switch and an input terminal of the second switch and configured to prevent discharging of a high voltage battery supplying the first voltage by blocking a dark current caused by non-use of the low voltage DC-DC converter.

The low voltage DC-DC converter of the environmentally friendly vehicle may further include a diode provided in a terminal into which the second voltage of the first DC-DC converter is inputted and configured to prevent the damage of the first DC-DC converter caused when a surge occurs in the high voltage battery supplying the first voltage.

The low voltage DC-DC converter of the environmentally friendly vehicle may further include a capacitor provided in a terminal into which the second voltage of the first DC-DC converter is inputted and configured to maintain the second voltage.

Various aspects of the present disclosure are directed to providing a method for outputting a constant voltage using a low voltage DC-DC converter of an environmentally friendly vehicle, the method including steps of: dropping, by a first DC-DC converter included in the low voltage DC-DC converter of the environmentally friendly vehicle, a second voltage lower than a first voltage supplied to a drive motor of the environmentally friendly vehicle to a third voltage; outputting, by a voltage regulator included in the low voltage DC-DC converter, a fourth voltage lower than the third voltage; operating, by a controller included in the low voltage DC-DC converter, in response to the fourth voltage; converting and outputting, by a second DC-DC converter included in the low voltage DC-DC converter, the first voltage into the third voltage in response to an output signal of the controller; and supplying, by the second DC-DC converter, the third voltage to the voltage regulator.

The method may further include outputting, by a divider resistor included in the low voltage DC-DC converter, the second voltage.

The controller may detect a failure of the divider resistor based on a voltage of the divider resistor.

The method may further include transmitting, by a first switch included in the low voltage DC-DC converter, the first voltage to the second DC-DC converter; and transmitting, by a second switch included in the low voltage DC-DC converter, the first voltage to the divider resistor, supplying an output voltage of the second DC-DC converter to the voltage regulator and then blocking the first voltage from being transmitted to the divider resistor.

The method may further include preventing, by block switches included in the low voltage DC-DC converter, discharging of a high voltage battery supplying the first voltage by blocking a dark current caused by non-use of the low voltage DC-DC converter.

The method may further include preventing, by a diode included in the low voltage DC-DC converter, the damage of the first DC-DC converter caused when a surge occurs in the high voltage battery supplying the first voltage.

The method may further include maintaining, by a capacitor included in the low voltage DC-DC converter, the second voltage.

According to the exemplary embodiment of the present disclosure, the low voltage DC-DC converter of the environmentally friendly vehicle and the method for outputting the constant voltage using the low voltage DC-DC converter may perform a function of a low voltage battery (e.g., 12 (volt) battery) as a constant power supply. According to various exemplary embodiments of the present disclosure, since the low-voltage battery such as a lead storage battery may be removed from the environmentally friendly vehicle, it is possible to reduce the cost of the environmentally friendly vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
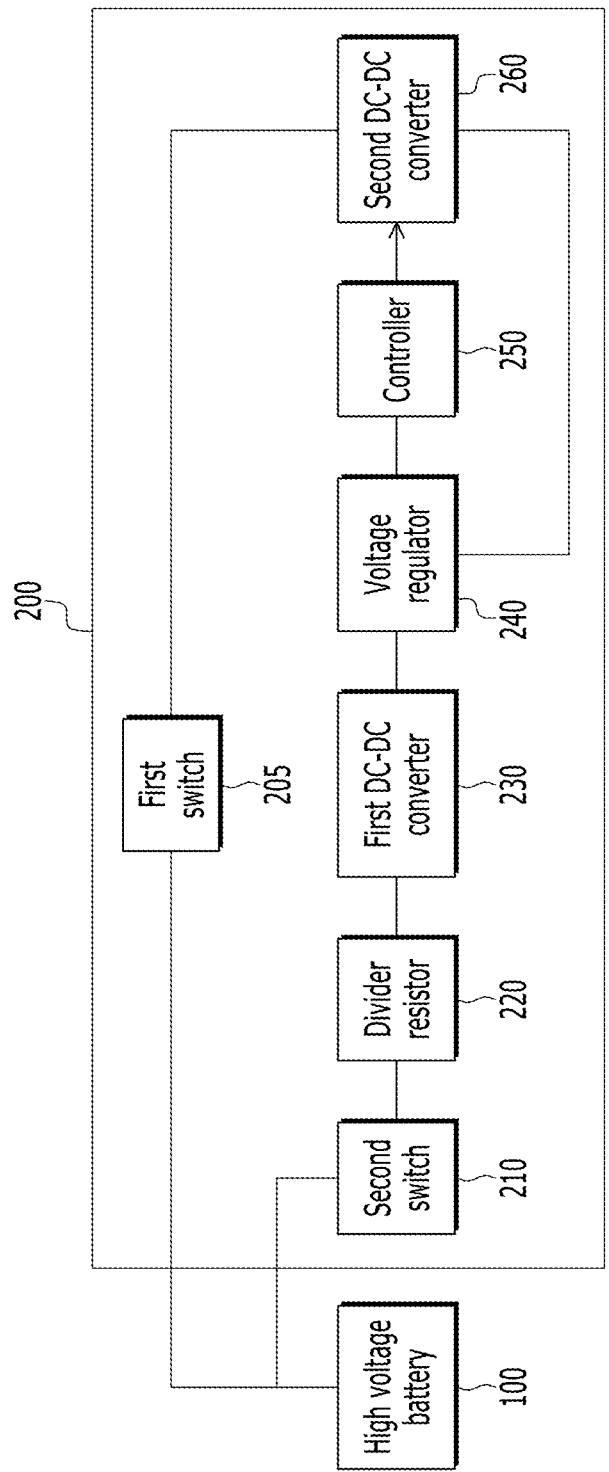
FIG. 1 is a block diagram describing a low voltage DC-DC converter of an environmentally friendly vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To sufficiently appreciate objects achieved as an exemplary embodiment of the present disclosure and exemplary embodiments of the present disclosure, accompanying drawings illustrating the exemplary embodiments of the present disclosure and contents included in the accompanying drawings should be referred.

Hereinafter, the present disclosure will be described in detail by describing exemplary embodiments of the present disclosure with reference to the accompanying drawings. In the following description, a detailed explanation of related known configurations or functions may be omitted to avoid obscuring the subject matter of the present disclosure. Like reference numerals provided in each drawing may refer to like elements.

Terms used in the present specification are used only to describe specific exemplary embodiments of the present disclosure, and are not intended to limit the present disclosure. Singular expressions used herein include plurals expressions unless they have definitely opposite meanings in the context. In the present application, it should be understood that term "include" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Furthermore, throughout this specification, when a certain part is "connected" with the other part, it is meant that the certain part may be "directly connected" with the other part and "electrically or mechanically connected" with the other part with another element interposed therebetween.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the exemplary embodiment of the present disclosure.

FIG. 1 is a block diagram describing a low voltage DC-DC converter of an environmentally friendly vehicle according to various exemplary embodiments of the present disclosure.

Referring to FIG. 1, a low voltage DC-DC converter 200 of the environmentally friendly vehicle may include a first switch 205, a second switch 210, a divider resistor 220, a first DC-DC converter 230, a voltage regulator 240 such as a low-dropout (LDO) voltage regulator, a controller 250, and a second DC-DC converter 260.

The first switch 205 is provided between a high voltage battery 100 and the second DC-DC converter 260 to transmit or block a first voltage (power) of the high voltage battery to the second DC-DC converter 260. The high voltage battery 100 may supply a first voltage (e.g., voltage of 600 (volt) or greater and 800 (volt) or less) to a drive motor configured for driving the environmentally friendly vehicle.

The second switch 210 may transmit or block the first voltage (power) of the high voltage battery 100 to the divider resistor 220. When the first voltage (power) of the high voltage battery 100 is blocked from being transmitted to the divider resistor 220 by the second switch 210, the power consumption by the divider resistor 220 may be prevented.

In another exemplary embodiment of the present disclosure, in an input terminal of the first switch 205 and an input terminal of the second switch 210, block switches may be provided to prevent discharging of the high-voltage battery 100 by blocking a dark current caused by non-use of the low voltage DC-DC converter 200 of the environmentally friendly vehicle.

The divider resistor 220 may include resistors coupled in parallel. The divider resistor 220 divides the first voltage of the high voltage battery 100 transmitted through the second switch 210 to generate (output) a dividing voltage (e.g., voltage of 60 (volt) or greater and 80 (volt) or less) which is the second voltage.

The first DC-DC converter 230 may drop the second voltage dropped (reduced) through the divider resistor 220 to an input voltage (e.g., 24 (volt)) of the voltage regulator 240 which is a third voltage. In another exemplary embodiment of the present disclosure, in a terminal into which the second voltage of the first DC-DC converter 230 is inputted (supplied), a diode (e.g., transient voltage suppressor (TVS) diode) may be provided to prevent the damage (e.g., burning) of the first DC-DC converter which may be caused when a surge occurs in the high voltage battery 100 or one resistor included in the divider resistor 220 is opened. In another exemplary embodiment of the present disclosure, in the terminal into which the second voltage of the first DC-DC converter 230 is inputted (supplied), a capacitor (e.g., electrolytic capacitor) may be provided to stably supply the second voltage or maintain the second voltage.

The voltage regulator 240 may drop (or change) the third voltage to an input voltage (e.g., 5 (volt)) of the controller 250 which is a fourth voltage. In another exemplary embodiment of the present disclosure, in a terminal into which the third voltage of the voltage regulator 240 is inputted (supplied), a capacitor (e.g., electrolytic capacitor) may be provided to stably supply the third voltage or maintain the third voltage.

The controller 250 may operate in response to the fourth voltage and may control the operation of the second DC-DC converter 260. The controller 250 may control the operation of the first switch 205 and the operation of the second switch 210. When the controller 250 operates, the state of the first switch 205 may be an ON state and the state of the second switch 210 may be an OFF state. When the state of the second switch 210 is the OFF state, the power consumption by the divider resistor 220 may be prevented. In another exemplary embodiment of the present disclosure, in a terminal into which the fourth voltage of the controller 250 is inputted (supplied), a capacitor (e.g., electrolytic capacitor) may be provided to stably supply the fourth voltage or maintain the fourth voltage.

The controller 250 may control the overall operation of the low voltage DC-DC converter of the environmentally friendly vehicle as an electronic control unit (ECU). The controller 250 may detect a failure (e.g., open of one resistor included in the divider resistor) of the divider resistor based on the voltage of the divider resistor 220. The controller 250 may be, for example, at least one microprocessor operating by a program (control logic) or hardware (e.g., microcomputer) including the microprocessor, and the program may include a series of instructions for performing a method for outputting a constant voltage using the low voltage DC-DC converter of the environmentally friendly vehicle according to the exemplary embodiment of the present disclosure. The instructions may be stored in the memory of the controller 250.

The second DC-DC converter 260 may include a full bridge converter connected to a rectifier. The second DC-DC converter 260 may convert (transform) and output the first voltage (e.g., voltage of 600 (volt) or higher and 800 (volt) or less) of the high voltage battery in response to an output signal (or control signal) of the controller 250 into the third voltage (e.g., 24 (volt)) which may be used in an electronic load (e.g., a controller of the environmentally friendly vehicle) of the environmentally friendly vehicle. The output voltage of the second DC-DC converter 260 is supplied (provided) to the voltage regulator 240 to maintain the operation of the voltage regulator.

Figure 2:
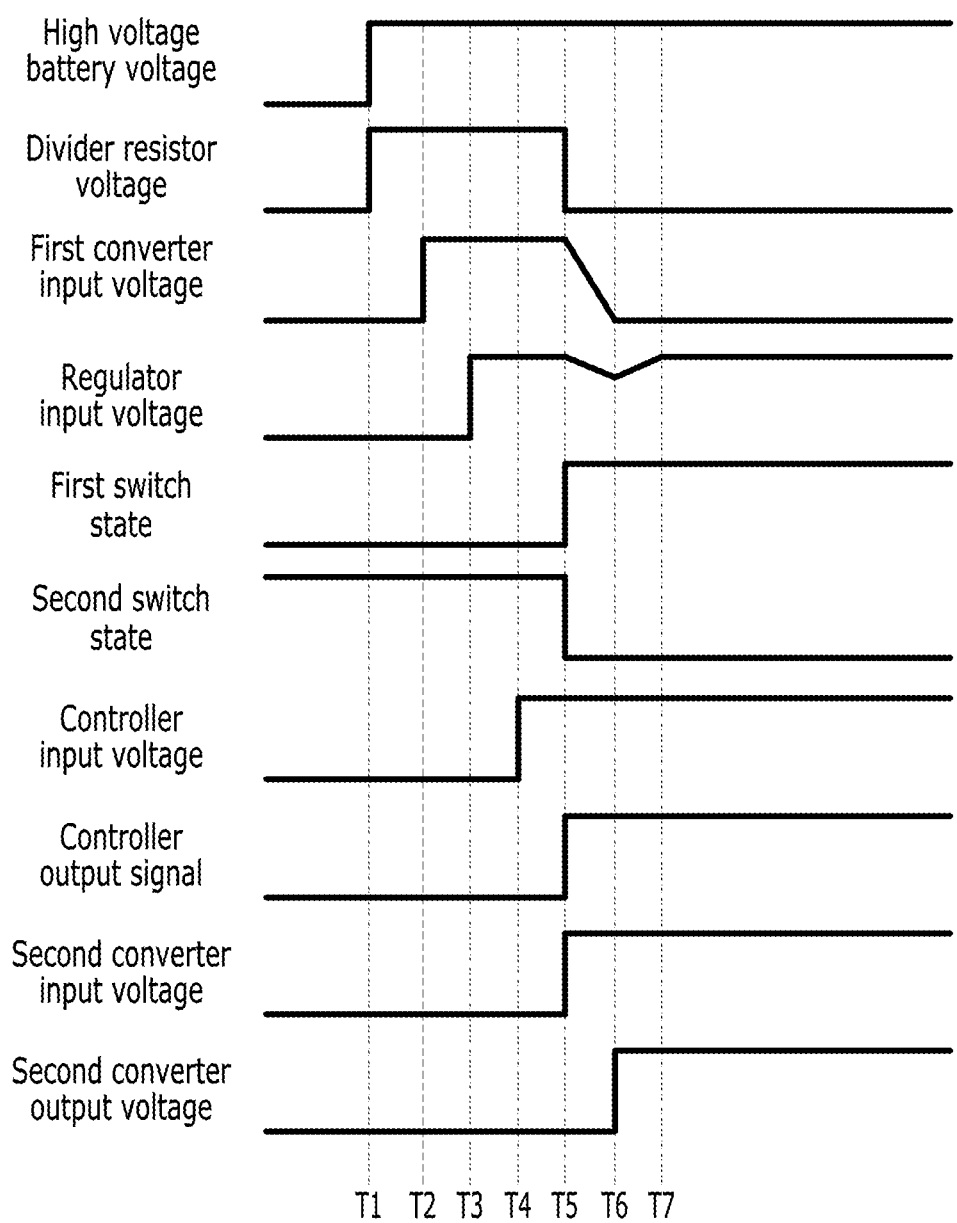
FIG. 2 is a timing diagram (timing chart) describing an operation of the low voltage DC-DC converter of the environmentally friendly vehicle illustrated in FIG. 1.

FIG. 2 is a timing diagram (timing chart) describing the operation of the low voltage DC-DC converter of the environmentally friendly vehicle illustrated in FIG. 1.

Referring to FIG. 1 and FIG. 2, at a first time T1, the first voltage of the high voltage battery 100 is supplied (applied) to the divider resistor 220 through the second switch 210 so that the second voltage may be output.

At a second time T2 after the first time T1, the input voltage of the first DC-DC converter 230 as the second voltage may be delayed and generated by a time (T2−T1) by the capacitor connected to the input terminal of the first DC-DC converter.

At a third time T3 after the second time T2, the third voltage as the output voltage of the first DC-DC converter 230 may be delayed by a time (T3−T2) by the capacitor connected to the input terminal of the voltage regulator 240 to be generated as the input voltage of the voltage regulator 240.

At a fourth time T4 after the third time T3, the fourth voltage as the output voltage of the voltage regulator 240 may be delayed by a time (T4−T3) by the capacitor connected to the output terminal of the voltage regulator 240 to be generated as the input voltage of the controller 250.

At a fifth time T5 after the fourth time T4, when the controller 250 operates to generate an output signal for controlling the second DC-DC converter 260, the state of the first switch 205 is the ON state and the first voltage of the high voltage battery 100 is supplied (provided) to the second DC-DC converter 260 to generate the input voltage of the second DC-DC converter 260, and the state of the second switch 210 is the OFF state to block the first voltage of the high voltage battery 100 from being transmitted to the divider resistor 220. When the first voltage of the high voltage battery 100 is blocked from being transmitted to the divider resistor 220, the input voltage of the first DC-DC converter 230 may be slowly reduced by the capacitor connected to the input terminal of the first DC-DC converter. When the input voltage of the first DC-DC converter 230 is slowly reduced, the input voltage of the voltage regulator 240 may be slowly reduced by the capacitor connected between the first DC-DC converter 230 and the voltage regulator 240.

At a sixth time T6 after the fifth time T5, the output voltage of the second DC-DC converter 260 may be generated by the output signal of the controller 250. The reduced input voltage of the voltage regulator 240 may start to be increased (restored) by the output voltage of the second DC-DC converter 260. The reduced input voltage of the first DC-DC converter 230 may be 0 (volt).

At a seventh time T7 after the sixth time T6, the input voltage of the voltage regulator 240 may be increased and maintained to the third voltage by the output voltage of the second DC-DC converter 260. The operation of the voltage regulator 240 may be maintained by the third voltage.

A component or "unit" or "er", or block or module used in the exemplary embodiment of the present disclosure may be implemented as software such as a task, a class, a sub routine, a process, an object, an execution thread, and a program performed in a predetermined area on the memory or hardware such as field programmable gate array (FPGA) or application-specific integrated circuit (ASIC) and furthermore, may be achieved by combining the software and the hardware. The component or 'unit' may be included in a computer readable storage medium and some of the component or 'unit' may be dispersively distributed.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

In addition, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A low voltage DC-DC converter of a vehicle, the low voltage DC-DC converter comprising:
    a first DC-DC converter configured to drop a second voltage lower than a first voltage supplied to a drive motor of the vehicle to a third voltage;
    a voltage regulator configured to regulate the third voltage to output a fourth voltage lower than the third voltage;
    a controller configured to operate in response to the fourth voltage; and
    a second DC-DC converter configured to convert and output the first voltage into the third voltage in response to an output signal of the controller,
    wherein an output voltage of the second DC-DC converter is supplied to the voltage regulator.

2. The low voltage DC-DC converter of the vehicle of claim 1, further including:
    a divider resistor configured to output the second voltage.

3. The low voltage DC-DC converter of the vehicle of claim 2, wherein the controller is configured to detect a failure of the divider resistor based on a voltage of the divider resistor.

4. The low voltage DC-DC converter of the vehicle of claim 2, further including:
    a first switch configured to transmit the first voltage to the second DC-DC converter; and
    a second switch configured to transmit the first voltage to the divider resistor, supply the output voltage of the second DC-DC converter to the voltage regulator and then block the first voltage from being transmitted to the divider resistor.

5. The low voltage DC-DC converter of the vehicle of claim 4, further including:
    the first switch provided between a battery and the second DC-DC converter to transmit or block the first voltage of the battery to the second DC-DC converter.

6. The low voltage DC-DC converter of the vehicle of claim 5, wherein the controller is configured to control operation of the first switch and operation of the second switch.

7. The low voltage DC-DC converter of the vehicle of claim 4, further including:
    block switches provided in an input terminal of the first switch and an input terminal of the second switch and configured to prevent discharging of a battery supplying the first voltage by blocking a dark current caused by non-use of the low voltage DC-DC converter.

8. The low voltage DC-DC converter of the vehicle of claim 1, further including:
    a diode provided in a terminal into which the second voltage of the first DC-DC converter is inputted and configured to prevent damage of the first DC-DC converter caused when a surge occurs in a battery supplying the first voltage.

9. The low voltage DC-DC converter of the vehicle of claim 1, further including:
    a capacitor provided in a terminal into which the second voltage of the first DC-DC converter is inputted and configured to maintain the second voltage.

10. A method for outputting a constant voltage using a low voltage DC-DC converter of a vehicle, the method comprising:
    dropping, by a first DC-DC converter included in the low voltage DC-DC converter of the vehicle, a second voltage lower than a first voltage supplied to a drive motor of the vehicle to a third voltage;
    regulating, by a voltage regulator included in the low voltage DC-DC converter, the third voltage and outputting, by the voltage regulator, a fourth voltage lower than the third voltage;
    operating, by a controller included in the low voltage DC-DC converter, in response to the fourth voltage;
    converting and outputting, by a second DC-DC converter included in the low voltage DC-DC converter, the first voltage into the third voltage in response to an output signal of the controller; and
    supplying, by the second DC-DC converter, the third voltage to the voltage regulator.

11. The method of claim 10, further including:
    outputting, by a divider resistor included in the low voltage DC-DC converter, the second voltage.

12. The method of claim 11, wherein the controller is configured to detect a failure of the divider resistor based on a voltage of the divider resistor.

13. The method of claim 11, further including:
    transmitting, by a first switch included in the low voltage DC-DC converter, the first voltage to the second DC-DC converter; and
    transmitting, by a second switch included in the low voltage DC-DC converter, the first voltage to the divider resistor, supplying an output voltage of the second DC-DC converter to the voltage regulator and then blocking the first voltage from being transmitted to the divider resistor.

14. The method of claim 13, wherein the controller is configured to control operation of the first switch and operation of the second switch.

15. The method of claim 10, further including:
preventing, by block switches included in the low voltage DC-DC converter, discharging of a battery supplying the first voltage by blocking a dark current caused by non-use of the low voltage DC-DC converter.

16. The method of claim 10, further including:
preventing, by a diode included in the low voltage DC-DC converter, a damage of the first DC-DC converter caused when a surge occurs in a battery supplying the first voltage.

17. The method of claim 10, further including:
maintaining, by a capacitor included in the low voltage DC-DC converter, the second voltage.

\* \* \* \* \*